US005793884A

United States Patent [19]
Farrell

[11] Patent Number: 5,793,884
[45] Date of Patent: Aug. 11, 1998

[54] SPECTRAL BASED COLOR IMAGE EDITING

[75] Inventor: Joyce E. Farrell, Menlo Park, Calif.

[73] Assignee: Hewlett-Packard Company, Palo Alto, Calif.

[21] Appl. No.: 574,670

[22] Filed: Dec. 19, 1995

[51] Int. Cl.$^6$ .......................... H04N 1/60; H04N 5/243; H04N 9/64
[52] U.S. Cl. ...................... 382/167; 358/509; 358/518; 348/222; 348/227; 364/526
[58] Field of Search ........................ 382/167; 358/504, 358/509, 518, 519, 520, 523; 348/222, 227, 645, 649, 650; 364/526

[56] References Cited

U.S. PATENT DOCUMENTS

| 5,157,506 | 10/1992 | Hannah | 358/518 |
| 5,481,380 | 1/1996 | Bestmann | 358/504 |

OTHER PUBLICATIONS

"Color Constancy: A Method For Recovering Surface Spectral Reflectance", Laurence T. Maloney and Brian A. Wandell; Journal of the Optical Society of America A. vol. 3, pp. 29–33; Jan. 1986.

"Bayesian Method for RecoveringSurface and Huminant Properties from Photosensor Responses", David H. Brainard & William T. Freeman; SPIE-The International Society for Optical Engineering; Feb. 8–10, 1994, vol. 2179; pp. 364–376.

"A Spatial Processor Model For Object Colour Perception", G. Buchsbaum, Dept. of Bioengineering, School of Engineering & Applied Science, University of Pennsylvania, Philadelphia, Pennsylvania, vol. 310, No. 1, Jul. 1980, pp. 1–26.

"Color Correction Using Principal Components", M.J. Vrhel & H.J. Trussell; CCC, vol. 17, No. 5, Oct. 1992, pp. 328–338.

*Primary Examiner*—Scott Rogers
*Attorney, Agent, or Firm*—Pamela Lau Kee

[57] ABSTRACT

A color image editing system and method uses sensor responses in an image capture device to estimate and separate illuminant and surface reflectance in a scene. The system uses the estimated surface reflectances, along with a desired illuminant SPD, to calculate the corresponding XYZ values. To render the images on an imaging device, the XYZ values are converted into device-dependent display or printer values. The image data may be manipulated in a manner that is intuitive to humans, such as correcting the image data according to changes in lighting and surface color.

An image capture device, such as a scanner or digital camera, represents a scene as image data that is resolved as device-dependent channels, such as RGB. For each channel, the spectral reflectances of the surfaces within the scene are described reflectance functions that are independnt of the lighting function that describes the illuminant spectral power distribution (SPD). Display operators can independently adjust the surface and lighting functions.

9 Claims, 8 Drawing Sheets the amount of energy emitted over a range of

SPECTRAL BASED COLOR IMAGE EDITING

FIELD OF THE INVENTION

The invention is directed toward image processing and more specifically towards correcting illumination in images captured by digital media, such as scanners or digital cameras.

BACKGROUND OF THE INVENTION

Commercially available color image editing (CIE) systems are part of large graphics systems, such as desktop publishing systems that allow users to generate digital representations of color images, edit digital representations for visual appeal, and reproduce digital representations on different media. These systems include image capture devices, such as digital cameras and scanners, image processing hardware, and color displays and printers.

Today, most image capture devices have three color sensors which convert a multi-dimensional spectral signal representing a scene into the output of three color channels: red (R), green (G), and blue (B). The RGB values of the image capture device are ultimately transformed into device representations of the color display (RGB) or the color printer (CMYK). The methods for achieving this transformation are a critical part of any color image editing system.

Prior art CIE systems are based on transformations of device-dependent RGB values into human-based representations, such as CIE XYZ. These intermediate XYZ values are then transformed into display RGB values via a 3×3 transformation matrix or into printer CMYK values via a look-up table. This intermediate transformation facilitates matches in color appearance between the original image or scene and the rendered image or scene. If the XYZ values in the original scene match the XYZ values in the rendered scene, point by point, then the color appearance of the original and rendered scene will match. If the XYZ values between the original and rendered scene do not match on a point by point basis, there is no guarantee that the two scenes will appear identical.

These prior art CIE systems have several disadvantages. First, XYZ matching assumes that the illuminant in the original and the rendered scene are identical. While it may be possible to design image capture devices that generate device RGB values that are within a linear transformation of XYZ values for surfaces under one illuminant, it is not possible to design image capture devices that generate device RGB values that are within linear transformations of XYZ values for surfaces under any arbitrary or uncontrolled illuminant. Thus, the mapping from the image capture device RGB values into the human-based XYZ values will always be accompanied by some information loss and, consequently, a color appearance mismatch.

Furthermore, prior art CIE systems do not separate the effects of the illuminant spectral power distribution (SPD) from the effects of the surface reflectances on the image capture sensors. As a result, they manipulate image properties derived from CIE XYZ representations, such as hue, saturation, and brightness. These manipulations, however perceptual in nature, must be learned by operators.

A color image editing system that allowed for color manipulation and adjustments based on illumination is desirable. It would be a further benefit if the manipulations and adjustments were intuitive to humans by corresponding to change in lighting and surface color.

SUMMARY OF THE INVENTION

A spectral-based color image editing (SBCIE) system provides a general framework for image correction, composition, and enhancement. An operator can correct images that were captured under bad illumination, combine images captured under different illumination, or select illuminants that make the image visually appealing. Image manipulations are intuitive to humans because they correspond to changes in light and surface color.

A color image editing system and method uses sensor responses of an image capture device to estimate and separate lighting and surface reflectances in a scene. The system uses the estimated surface reflectances, along with a desired illuminant spectral power distribution (SPD), to calculate the corresponding XYZ values. To render the images on an imaging device, the XYZ values are converted into device-dependent display or printer values.

An image capture device, such as a scanner or digital camera, represents a scene as image data that is resolved as device-dependent channels, such as RGB. For each channel, the spectral reflectances of the surfaces within the scene are described as functions that are independent of a lighting function. The lighting function describes illuminant spectral power distribution (SPD).

First, an illuminant spectral signature of the image capture device is measured using a spectrophotometric sensor or the lighting function is estimated. Next, a scene is captured as image data. A scene transfer function is generated as a combination of the lighting function and the device signature of the image capture device. The image capture data is transformed according to the scene transfer function to generate a scene signature that uniquely describes the scene without the effect of the image capture device. Display operators can independently adjust the surface and lighting components of the scene signature to achieve a desired image.

DETAILED DESCRIPTION OF THE PREFERRED EMBODIMENTS

A spectral-based color image editing (SBCIE) system provides a general framework for image correction, composition, and enhancement. An operator can correct images that were captured under bad illumination, combine images captured under different illumination, or select illuminants that make the image visually appealing. Image manipulations are intuitive to humans because they correspond to changes in light and surface color.

The spectral power distribution (SPD) of an illuminant can be described by a single vector, e, having entries which represent wavelengths. For each surface, a spectral radiance factor, the light spectra that is emitted from the surface, has both diffuse and fluorescent components which are described as a n by n matrix, S, where n is the number of entries representing the function values over a range of wavelengths. For example, n=31 when the function values are sampled between 400 nm and 700 nm in 10 nm steps. The diffuse components have values solely along the diagonal vector s of the matrix S. Fluorescing components, which absorb light in one wavelength and emit light in a longer wavelength, cannot be described by a single vector.

The combined spectral signature of multiple illuminants, e, can be approximated by a linear combination of a smaller set of spectral basis functions, $B_i$, where f is the number of basis functions and $w_i$ are the weights chosen to minimize the square error between the illuminant and its linear model approximation.

$$e = \sum_{i=1}^{f} w_i B_i$$

The spectral signatures of diffuse surfaces, s, may be described by a linear combination of a smaller set of spectral basis functions.

$$s = \sum_{i=1}^{f} w_i B_i$$

These low-dimensional linear models of illuminant spectra and surface reflectances are efficient and reduce the amount of stored data required to reconstruct the spectral representations.

Similarly, the spectral signature of a digital camera in terms of RGB values tends to be low-dimensional spectral data. The dimensionality of the image capture data limits the dimensionality of the spectral reflectance functions. The accuracy of the spectral signatures of surfaces and illuminants is therefore limited by the inherent dimensionality of the illuminant spectra and surface reflectances, the dimensionality of the image capture data, and current knowledge about surfaces and illuminant spectra.

Figure 1:
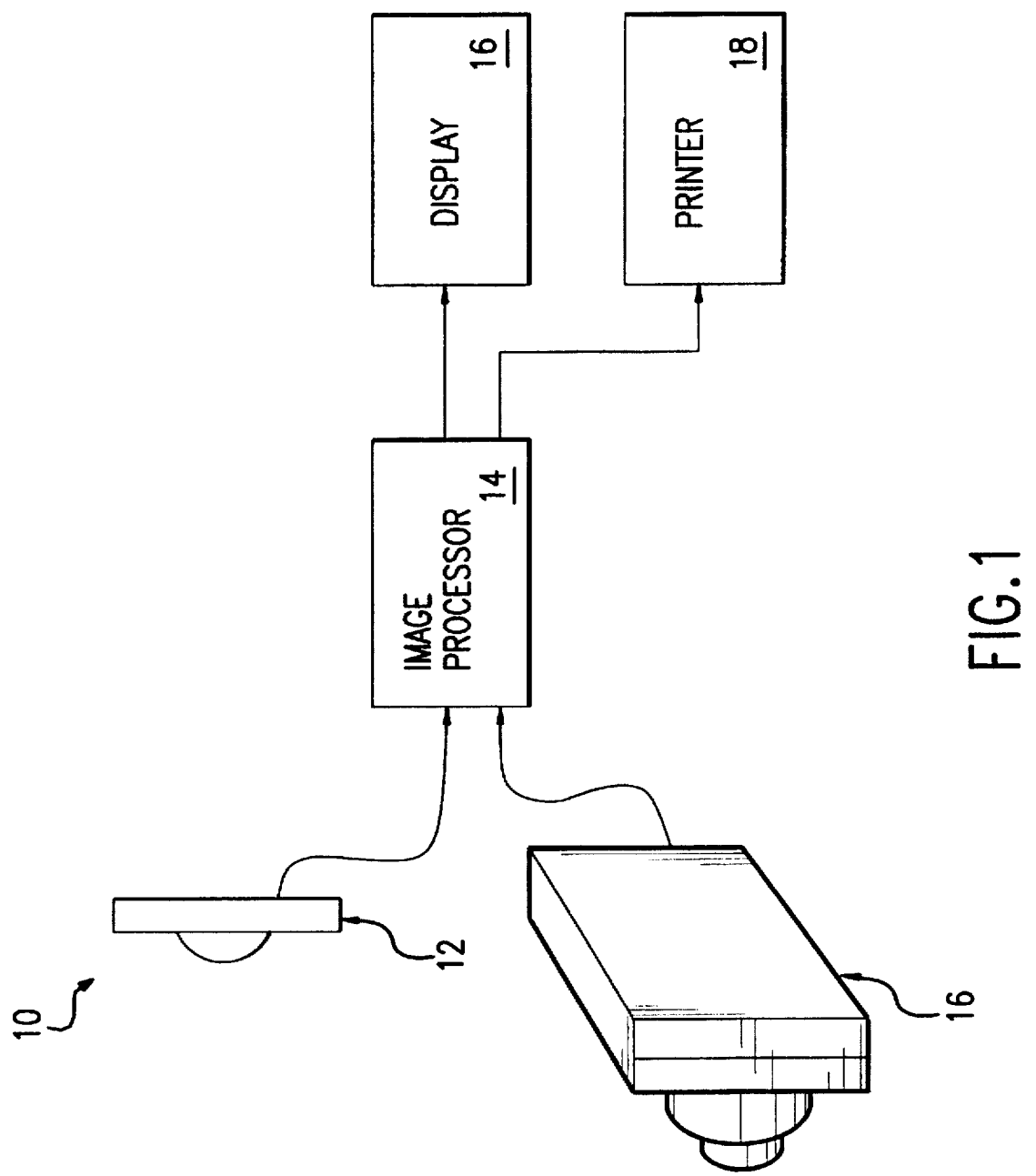
FIG. 1 illustrates an embodiment for a SBCIE system.

FIG. 1 illustrates an embodiment for a SBCIE system 10. A spectrophotometric sensor 12 is connected to an image processor 14. The image processor 14 is further connected to a digital camera 16 and a display monitor 18. A printer 20 is connected to the image processor 14 and the display monitor 18.

In this embodiment, the spectrophotometric sensor 12, such as that disclosed by Vincent in U.S. Pat. No. 5,144,498, is based on a wedge filter that records both the color signal and the illuminant SPD such that it is possible to estimate the surface reflectances. The digital camera 16 is a DCS200 digital camera offered by the Kodak Company. The digital camera 16 has three sensors and a known device signature.

Figure 2:
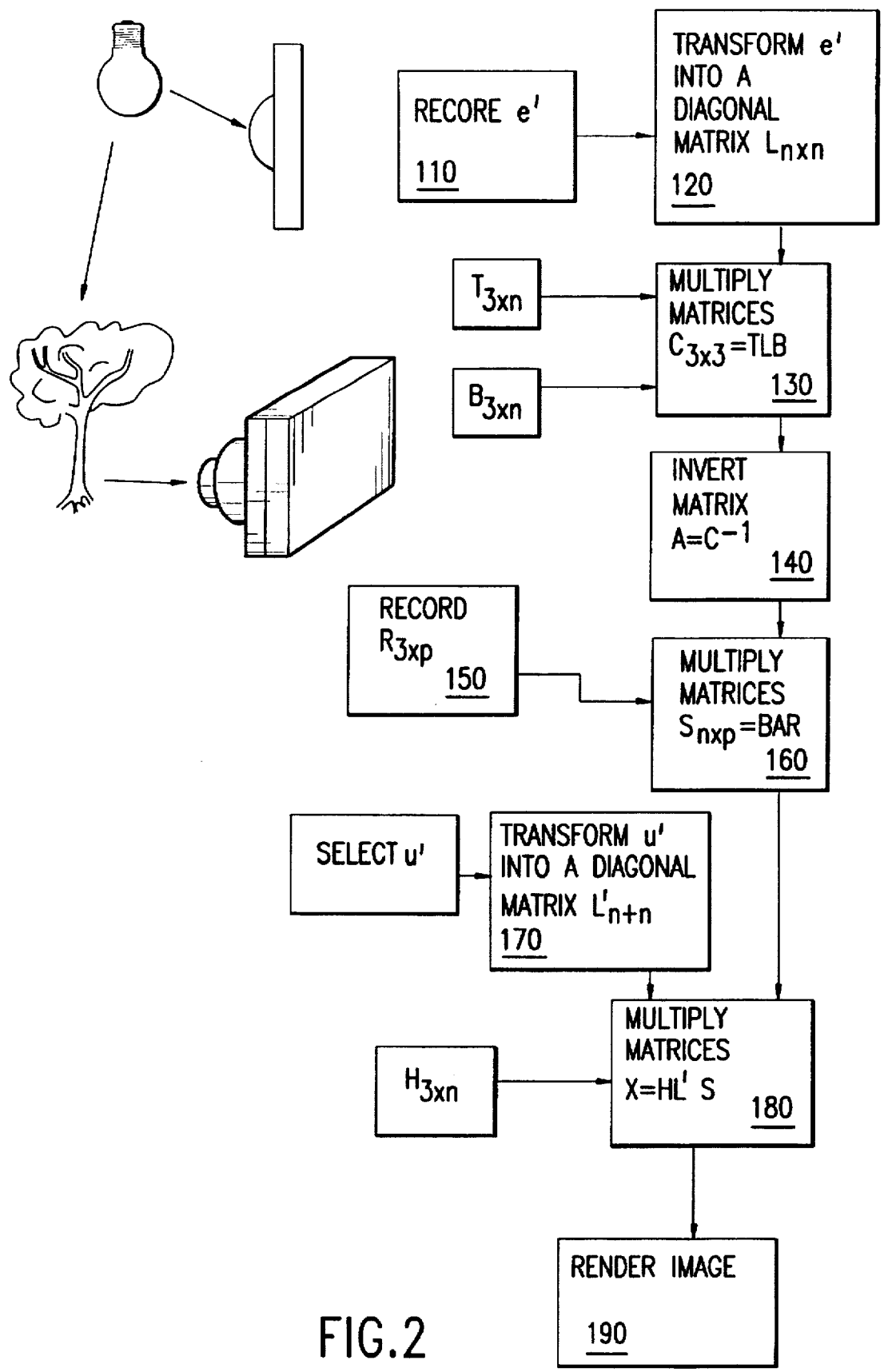
FIG. 2 illustrates a flowchart for the SBCIE system shown in FIG. 1.

FIG. 2 illustrates a process flow chart for the SBCIE system 10 shown in FIG. 1. The method for generating representations of spectral reflectances in scenes is based on knowledge of or estimation of the illuminant spectral power distribution, knowledge of the spatial distribution and spectral sensitivities of f camera sensors, f camera sensor responses for surfaces in the illuminated scene, and assumption about the f basis function for surface spectral reflectances.

In step 110, the illuminants in a scene are stored as an illuminant spectral signature, e'. A preferred method for gathering illuminant information is to directly measure it using a spectrophotometric sensor. An alternate method is to restrict the dimensionality of the linear vector space for representing the illuminant SPD, such as Buchsbaum disclosed in "A spatial processor model for object color perception", Journal of the Franklin Institute, Vol 310, pp. 1–26, 1980, and then to estimate the illuminant SPD from the distribution of color pixels in the captured image. The performance of the estimation algorithms depend upon the number of classes of color sensors. The larger the number of color sensor classes, the more accurate the illuminant SPD estimates are.

In step 120, the illuminant spectral signature, e', is transformed into a diagonal matrix, L, with n×n vectors. In step 130, the illuminant matrix, L, along with two stored functions that describe the spectral sensitivities of the digital cameras, T, and 3 spectral surface basis functions, B, are multiplied to create a scene transfer matrix, C, that describes all images captured by the digital camera, T, where illuminant and surface information are decoupled. In this embodiment, L is a n×n matrix having values solely along the diagonal, T is a 3×n matrix, and B is a n×3 matrix. The resulting scene transfer matrix, C, is a 3×3 matrix. In a general form that describes f sensors, L is a n×n matrix, T is a 3×f matrix, B is a f×3 matrix, and C is a f×f matrix.

In step 140, a matrix A is created by inverting the matrix C. In step 150, an image of the scene is captured and stored as a 3×p matrix of sensor pixel values, R. In step 160, a n×p scene matrix, S, that describes the spectral reflectance of all points sampled, is constructed by multiplying 3 matrices: B, a n×3 matrix representing the 3 spectral basis functions for surface reflectances, the inverted scene transfer matrix A, and the sensor pixel value matrix R. In this step, the system operator may change the spectral representations of surfaces in the scene, S, such as changes in the skin tone of a person, the color of a dress, the saturation of grass, or the color of drapes.

In step 170, the spectral representation of scene illumination may be altered manually or automatically by selecting a new scene illuminant vector, u'. The new scene illuminant vector, u', is transformed into an n×n diagonal matrix, L. In step 180, L' is combined with S and H to calculate the XYZ values that should be displayed or printed. When done manually, the illuminant SPD or surface reflectance can be changed until the image is visually appealing, such as in the color correction scheme proposed by Vrhel and Trussell in "Color correction using principal components", Color Research and Application, Vol. 17, pp. 329–337, 1992. In step 190, the image is rendered.

Figure 3:
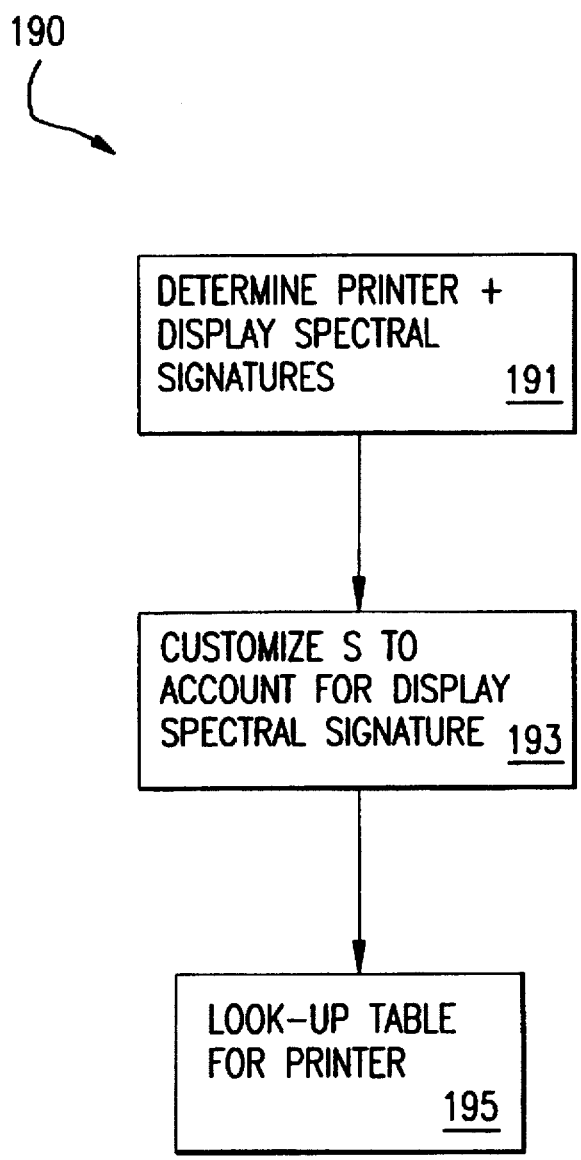
FIG. 3 illustrates a flowchart for step 50 shown in FIG. 2.

FIG. 3 illustrates a flowchart for rendering the scene. In step 191, a printer spectral signature and a display spectral signature are determined. In step 193, the scene function, S, is customized to account for the display spectral signature. In step 195, the specific image may be rendered according to a lookup-table or specific function that corresponds to the printer spectral signature.

Figure 4:
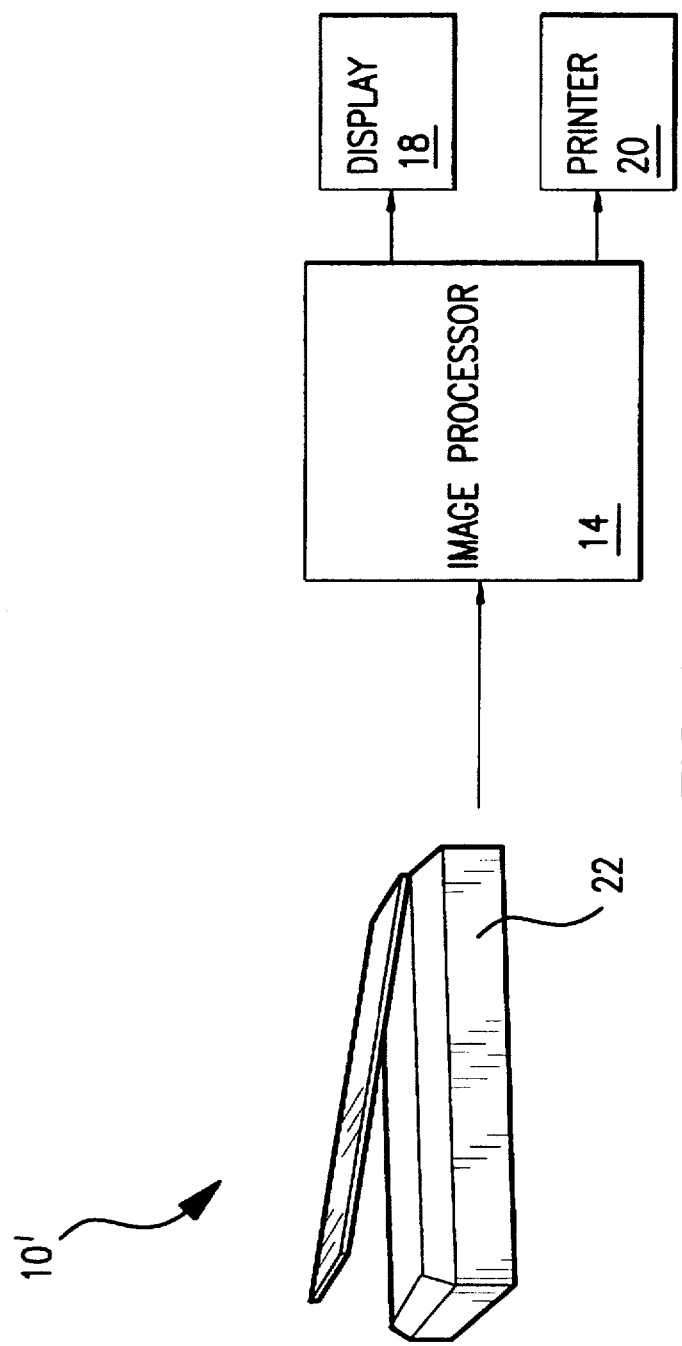
FIG. 4 illustrates another embodiment for the SBCIE system.

FIG. 4 illustrates an alternate embodiment for the SBCIE system 10'. The image processor 14 is connected to the printer 20, the display monitor 18, and a color scanner 22. Scanner RGB values are used to estimate the weight factors of three reflectance basis functions. The estimated weights and the corresponding spectral basis functions are then used to build three-dimensional linear representations of surface spectral reflectances. This embodiment may be generalized to scanners with f spectral channels, estimating weights for f surface reflectance basis functions.

Figure 5:
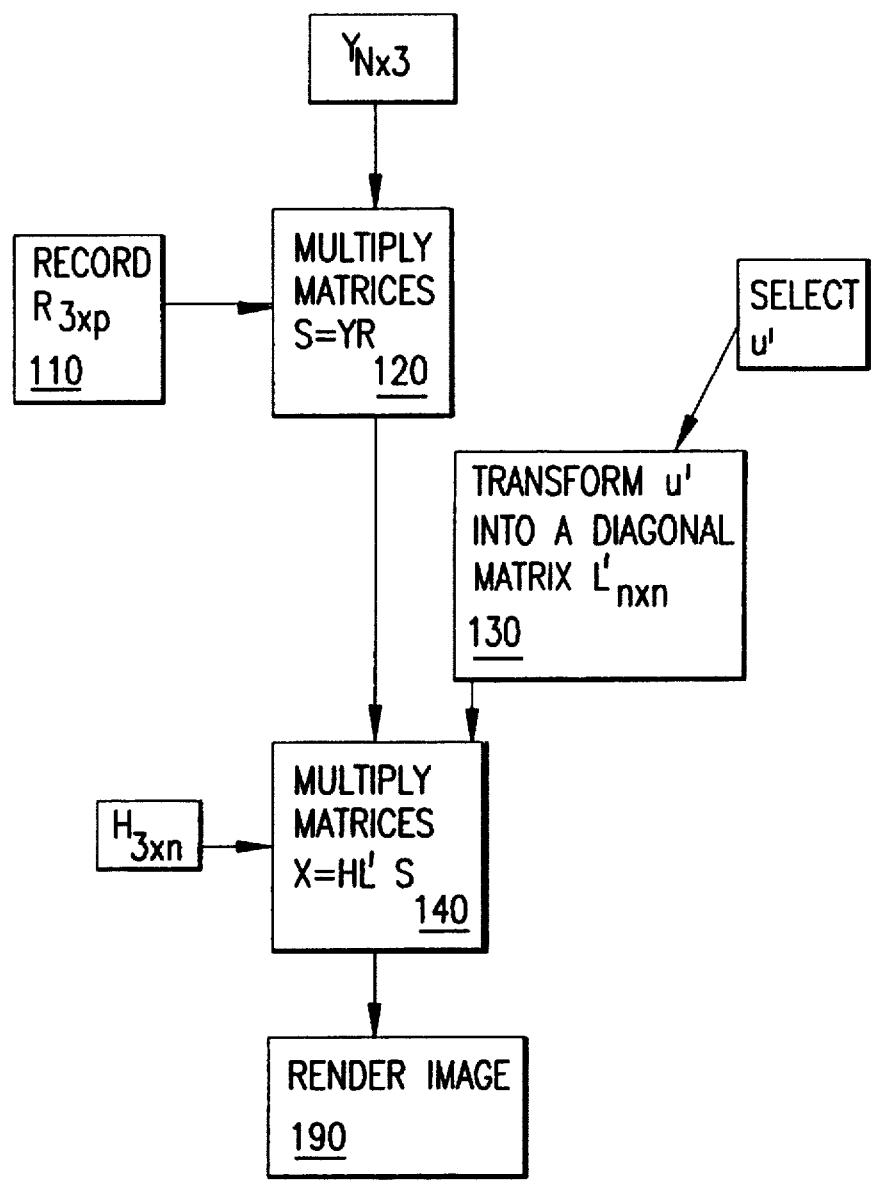
FIG. 5 illustrates a flowchart for the embodiment shown in FIG. 4.

FIG. 5 outlines a process flow chart for the embodiment shown in FIG. 4.

In step 110, a color document is scanned, thereby creating a 3×p matrix of sensor responses, R. In step 120, a surface representation is constructed for each of the pixels in the scanned document by multiplying the 3×p matrix R with a stored function, Y. The matrix multiplication in step 120 can be stored in the scanner firmware as a n×3 matrix transformation applied to all scanner RGB values.

One approach to matrix multiplication is as follows. T is a 3×n matrix that describes the spectral responsivities of a three-channel scanner for a range of wavelength samples. T corresponds to the point-by-point product of the spectral power distribution of the scanner illuminant, the spectral transmittances of apparatus within the optical path, and the spectral responsivity of the CCD scanner sensor. B is a n×3 matrix representing the 3 spectral basis functions for surface reflectances. C is a matrix created by multiplying T with B. A is a 3×3 matrix created by inverting C. Y is created by multiplying B and A.

In step 130, the spectral representation of an illuminant, u', is selected and transformed into an n×n diagonal matrix, L'. In step 140, L' is combined with S and H to calculate the XYZ values that should be displayed or printed.

Although this embodiment is based on a 3-channel output, as the number of spectral channels increases, the estimates of the spectral reflectances will improve. The estimates can be optimized by judicious selection of the spectral basis functions.

Figure 6:
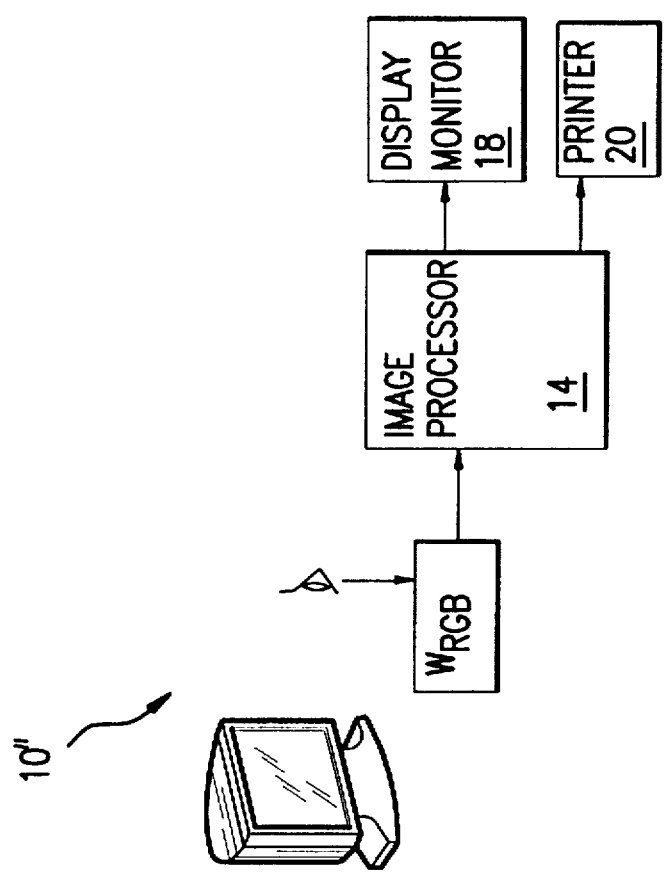
FIG. 6 illustrates an alternate embodiment for the SBCIE system.

FIG. 6 illustrates another alternate embodiment for the SBCIE system 10". The image processor 14 is connected between the printer 20 and the display monitor 18. Color images of scenes are often rendered on emissive or reflective displays. Even though image generation is unknown, the operator has a perception that the displayed images are realistic depictions of actual scenes. One key area in computer graphics is devoted to developing realistic spectral representations of surfaces and illuminants to be rendered on the display. One method is to have the operator select a region of the scene that corresponds to a white surface. Since a white surface has known spectral reflectance, an estimate of the illuminant spectral power distribution consistent with the displayed tristimulus values for the white surface can be made.

Figure 7A:
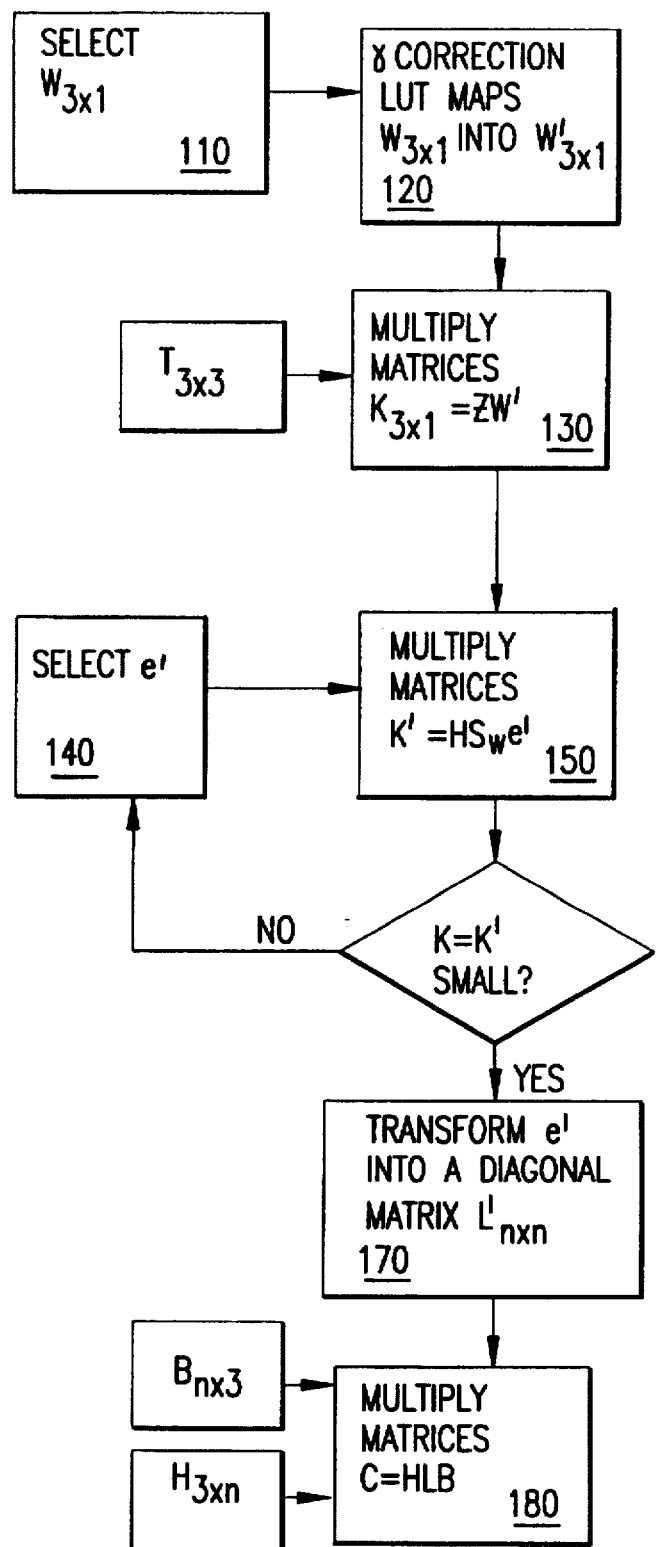
FIGS. 7A–B illustrate a flowchart for embodiment shown in FIG. 6.
Figure 7B:
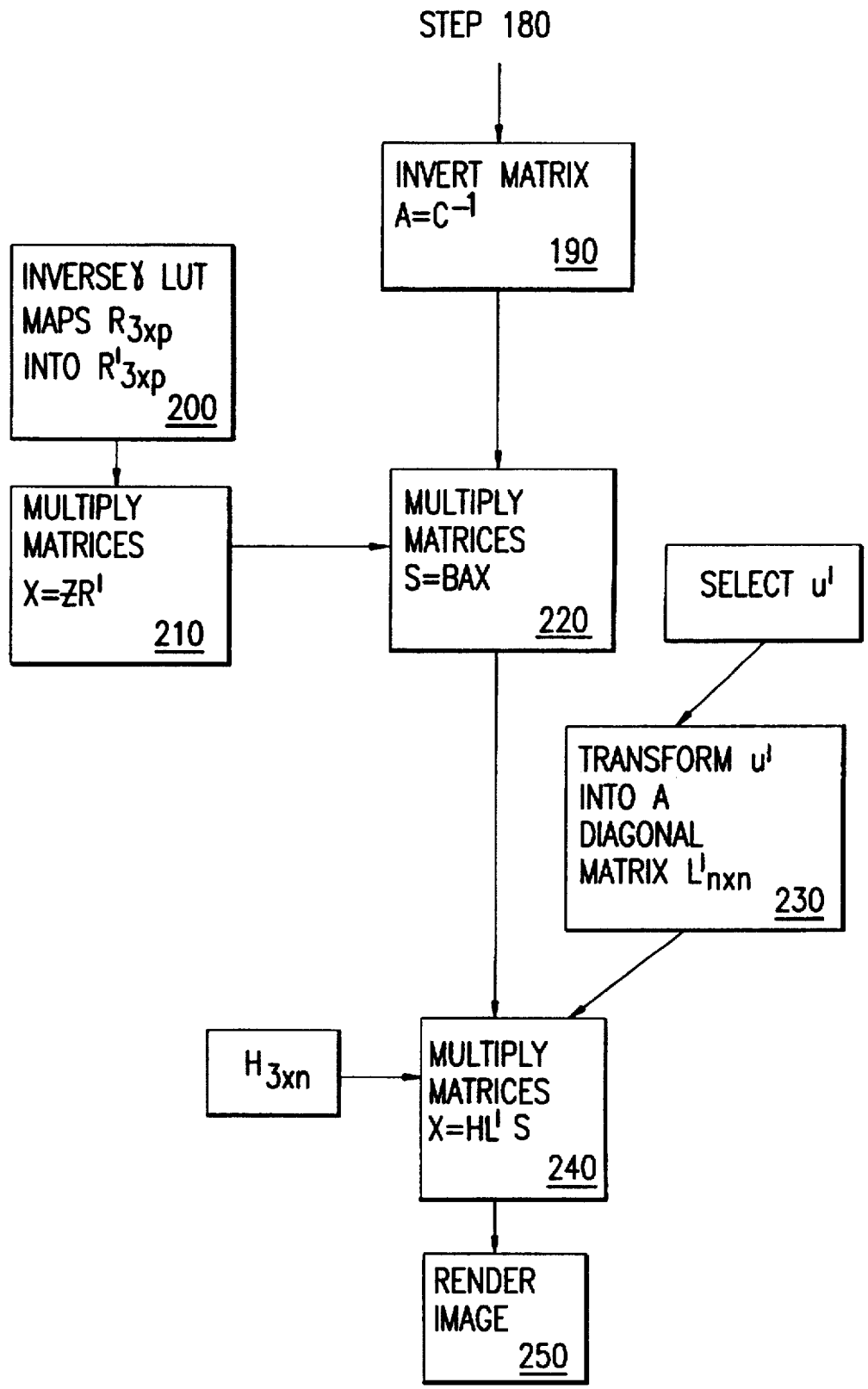

FIGS. 7A and B illustrate a flowchart for the embodiment shown in FIG. 6. In step 110, a pixel region that corresponds to a known surface, such as a white or neutral surface, is selected. The selection of this region can be accomplished manually (by the user) or automatically (by a programmed rule, such as computing the mean RGB values over the entire region, as in the "gray-world" assumption described by Buchsbaum). The mean RGB values of these pixels are stored as a 3×1 vector w. In step 120, the display gamma lookup table (LUT) is used to convert w to linear RGB values, w'. In step 130, w' is mapped into the displayed tristimulus values by multiplication with a stored 3×3 matrix generated by multiplying Z, a stored 3×n matrix containing the CIE XYZ color matching functions, H, and a n×3 matrix containing the spectral power distribution of the three display phosphors, M.

In step 140, an illuminant, e', is chosen that generates the tristimulus values k when it is reflected from the known surface. One way is provide a database of illuminant SPDs to find e' that minimizes the difference between the predicted tristimulus values, k', and the actual displayed tristimulus values, k. In step 140, an illuminant e' is chosen from a database. In step 150, k' is computed by multiplying e' with a n×n function representing the spectral reflectances of the known surface, $S_w$, and the stored function, H. In step 160, the predicted tristimulus values, k' and the actual displayed tristimulus values k are compared. If the difference between k and k' is less than a stored threshold, e' is passed as a vector to step 170 where it is transformed into a n×n diagonal matrix, L'.

In step 180, a scene transfer matrix, C, is generated by multiplying two stored functions: B, a n×3 matrix representing the surface spectral basis functions and H, a 3×n matrix representing the CIE XYZ color matching functions with L'. In step 90, the matrix C is inverted.

In step 200, the displayed 3×p RGB values for all p pixels in the image are passed through the LUT to generate RGB values that are linear with displayed luminance. In step 210, the linear RGB values, R', are converted into XYZ values by multiplying R' with Z to generate X.

In step 220, a representation of spectral reflectances of all points in the image is constructed. This is accomplished by matrix multiplication of B, a stored n×3 matrix, with A (the inverted scene transfer matrix), and X (a 3×p matrix containing the tristimulus values for all surfaces depicted in the scene).

In step 230, a new scene illuminant, u', is chosen and transformed into a n×n diagonal matrix, L'. As in the previous embodiments, the system operator may change the spectral representations of surfaces in the scene, S, in step 220, or the spectral representation of scene illumination, u'.

In step 240, L' is combined with S and H to calculate the XYZ values that should be displayed or printed. These XYZ values are then sent to appropriate LUTs for subsequent display or printing. In step 250, the image is rendered.

Although the invention has been described in three channel RGB space, it would be obvious to one skilled in the art to increase the number of the channels or translate the image data into a different visual representation such as CMY.

I claim:

1. A method for characterizing a scene as surfaces and illuminants comprising the steps of:

measuring an illuminant spectral signature of a capturing device;

capturing the scene as an array of pixel values;

characterizing a scene transfer function by combining the illuminant spectral signature with a device signature of the capturing device; and characterizing a scene signature by describing illumination and surfaces corresponding to the array of pixel values according to the scene transfer function.

2. A method for characterizing a scene as surfaces and illuminants, as defined in claim 1, further comprising the step of rendering the scene.

3. A method for characterizing a scene as surfaces and illuminants, as defined in claim 2, wherein the step of rendering further comprises the steps of:

customizing the scene signature to describe the surfaces in the scene;

customizing the scene signature according to an effective illuminant level; and rendering the scene signature.

4. A method for characterizing a scene as surfaces and illuminants, as defined in claim 1, wherein the step of capturing the scene comprises the step of scanning a rendered image.

5. A method for characterizing a scene as surfaces and illuminants, as defined in claim 3, wherein the step of customizing the scene signature to describe the surfaces in the scene further comprises the step of characterizing the scene signature according to a look-up table.

6. A method for characterizing a scene as surfaces and illuminants, as defined in claim 3, wherein the step of customizing the scene signature to describe the surfaces in the scene further comprises the step of rendering the scene surface matrix according to a transfer function that corresponds to a display device signature.

7. A method for characterizing a scene as surfaces and illuminants, as defined in claim 1, further comprising the step of capturing the device signature.

8. A method for characterizing a scene as surfaces and illuminants, as defined in claim 1, further comprising the step of modeling a set of surfaces as a surface spectral signature.

9. A method for characterizing a scene as surfaces and illuminants, as defined in claim 8, wherein the step of modeling a set of surfaces further comprises the steps of:

scanning a rendered scene;

generating an array of pixels that corresponds to the rendered scene; and determining a scene signature according to the array of pixels and the device signature.

* * * * *